US006728739B1

(12) United States Patent
Kobayashi et al.

(10) Patent No.: US 6,728,739 B1
(45) Date of Patent: Apr. 27, 2004

(54) DATA CALCULATING DEVICE AND METHOD FOR PROCESSING DATA IN DATA BLOCK FORM

(75) Inventors: Shiro Kobayashi, Yokohama (JP); Gerhard Fettweis, Dresden (DE)

(73) Assignees: Asahi Kasei Kabushiki Kaisha, Osaka (JP); Systemonic AG, Dresden (DE)

( * ) Notice: Subject to any disclaimer, the term of this patent is extended or adjusted under 35 U.S.C. 154(b) by 0 days.

(21) Appl. No.: 09/719,351

(22) PCT Filed: Jun. 14, 1999

(86) PCT No.: PCT/JP99/03157

§ 371 (c)(1), (2), (4) Date: Dec. 12, 2000

(87) PCT Pub. No.: WO99/66423

PCT Pub. Date: Dec. 23, 1999

(30) Foreign Application Priority Data

Jun. 15, 1998 (DE) .......................................... 198 26 252

(51) Int. Cl.[7] .................................................. G06F 5/01
(52) U.S. Cl. ........................ 708/208; 708/496; 708/550
(58) Field of Search ................................ 708/550, 551, 708/496, 497, 208

(56) References Cited

U.S. PATENT DOCUMENTS 4,282,581 A * 8/1981 Bondurant et al. ......... 708/530
4,727,506 A * 2/1988 Fling .......................... 708/551
4,811,268 A 3/1989 Nishitani et al. ........... 364/745
4,872,132 A 10/1989 Retter ........................ 364/748
5,294,925 A 3/1994 Akagiri ....................... 341/50
5,530,662 A 6/1996 Ide ............................ 364/736

FOREIGN PATENT DOCUMENTS

| | | |
|---|---|---|
| JP | 9-128213 | 5/1997 |
| JP | 9-507941 | 8/1997 |
| JP | 10-040073 | 2/1998 |
| WO | WO96/33457 | 10/1996 |

* cited by examiner

*Primary Examiner*—David H. Malzahn
(74) *Attorney, Agent, or Firm*—Finnegan, Henderson, Farabow, Garrett & Dunner, L.L.P.

(57) ABSTRACT

A data calculating device preferably used to improve the calculation precision when fixed-point calculation is performed by block-floating-point system.

Each piece of data of a data group is calculated, the minimum scale factor representative of the calculated data is detected as a group scale factor (GSF), and calculated data is subjected to scaling based on the detected GSFs. These processing are applied to each data group of a data block. The minimum GSF out of the detected GSFs is detected as a block scale factor (BSF). When calculation of the calculated data is performed again, the calculated data of the data group is subjected to scaling according to the GSFs and BSF before the calculation performed again.

7 Claims, 16 Drawing Sheets

FIG. 3

| | COEFFICIENT | MULTIPLY-ACCUMULATE OPERATION UNIT 0 | MULTIPLY-ACCUMULATE OPERATION UNIT 1 | MULTIPLY-ACCUMULATE OPERATION UNIT 2 | MULTIPLY-ACCUMULATE OPERATION UNIT 3 | |
|---|---|---|---|---|---|---|
| CYCLE 1 | | X(0) | X(1) | X(2) | X(3) | LOAD OF DATA GROUP |
| CYCLE 2 | A(3) | X(0) | 0 | 0 | 0 | MULTIPLY-ACCUMULATE OPERATION |
| CYCLE 3 | A(2) | X(1) | X(0) | 0 | 0 | MULTIPLY-ACCUMULATE OPERATION |
| CYCLE 4 | A(1) | X(2) | X(1) | X(0) | 0 | MULTIPLY-ACCUMULATE OPERATION |
| CYCLE 5 | A(0) | X(3) =Y(3) | X(2) =Y(2) | X(1) =Y(1) | X(0) =Y(0) | MULTIPLY-ACCUMULATE OPERATION |
| CYCLE 6 | | X(4) | X(5) | X(6) | X(7) | LOAD OF DATA GROUP |
| CYCLE 7 | A(3) | X(4) | X(3) | X(2) | X(1) | MULTIPLY-ACCUMULATE OPERATION |
| CYCLE 8 | A(2) | X(5) | X(4) | X(3) | X(2) | MULTIPLY-ACCUMULATE OPERATION |
| CYCLE 9 | A(1) | X(6) | X(5) | X(4) | X(3) | MULTIPLY-ACCUMULATE OPERATION |
| CYCLE 10 | A(0) | X(7) =Y(7) | X(6) =Y(6) | X(5) =Y(5) | X(4) =Y(4) | MULTIPLY-ACCUMULATE OPERATION |

FIG. 4

| | | OUTPUT OF MULTIPLY-ACCUMULATE OPERATION UNIT | LOCAL SCALE FACTOR | GROUP SCALE FACTOR | INPUT OF DATA MEMORY (AFTER GROUP NORMALIZATION) | BLOCK SCALE FACTOR | OUTPUT OF SECOND SHIFTER (AFTER BLOCK NORMALIZATION) |
|---|---|---|---|---|---|---|---|
| DATA GROUP 1 | Y (0) | 00000110 11000000 | 4 | 2 | 0 0 0 1 1 0 1 1 | 1 | 0 0 0 0 1 1 0 1 |
| | Y (1) | 00001001 10010000 | 3 | | 0 0 1 0 0 1 1 0 | | 0 0 0 1 0 0 1 1 |
| | Y (2) | 00010101 00000000 | 2 | | 0 1 0 1 0 1 0 0 | | 0 0 1 0 1 0 1 0 |
| | Y (3) | 00011100 01010000 | 2 | | 0 1 1 1 0 0 0 1 | | 0 0 1 1 1 0 0 0 |
| DATA GROUP 2 | Y (4) | 00100110 00000000 | 1 | 1 | 0 1 0 0 1 1 0 0 | | 0 1 0 0 1 1 0 0 |
| | Y (5) | 00100110 11000000 | 1 | | 0 1 0 0 1 1 0 1 | | 0 1 0 0 1 1 0 1 |
| | Y (6) | 00110010 10000000 | 1 | | 0 1 1 0 0 1 0 1 | | 0 1 1 0 0 1 0 1 |
| | Y (7) | 00101000 11100000 | 1 | | 0 1 0 1 0 0 0 1 | | 0 1 0 1 0 0 0 1 |
| DATA GROUP 1 | Z (0) | 00000001 10100000 | 6 | 2 | 0 0 0 0 0 1 1 0 | 1 | 0 0 0 0 0 0 1 1 |
| | Z (1) | 00000110 00001000 | 4 | | 0 0 0 1 1 0 0 0 | | 0 0 0 0 1 1 0 0 |
| | Z (2) | 00001010 10011000 | 3 | | 0 0 1 0 1 0 1 0 | | 0 0 0 1 0 1 0 1 |
| | Z (3) | 00010010 11010000 | 2 | | 0 1 0 0 1 0 1 1 | | 0 0 1 0 0 1 0 1 |
| DATA GROUP 2 | Z (4) | 00011001 01000000 | 2 | 1 | 0 0 1 1 0 0 1 0 | | 0 0 1 1 0 0 1 0 |
| | Z (5) | 00011111 00000000 | 2 | | 0 0 1 1 1 1 1 0 | | 0 0 1 1 1 1 1 0 |
| | Z (6) | 00100010 01001000 | 1 | | 0 1 0 0 0 1 0 0 | | 0 1 0 0 0 1 0 0 |
| | Z (7) | 00100110 10001000 | 1 | | 0 1 0 0 1 1 0 1 | | 0 1 0 0 1 1 0 1 |

FIG. 5

DATA MEMORY

| | |
|---|---|
| . . . | . . . |
| ADDRESS N | ADDRESS OF DATA MEMORY STORING DATA GROUP |
| ADDRESS N+1 | ADDRESS OF GROUP SCALE FACTOR REGISTER FILE STORING CORRESPONDING GROUP SCALE FACTOR |
| . . . | . . . |

FIG. 6

| | | BLOCK-FLOATING-POINT OPERATION (METHOD ACCORDING TO PRESENT INVENTION) | | | FLOATING-POINT CALCULATION |
|---|---|---|---|---|---|
| | | INPUT OF DATA MEMORY | | | |
| | | (BINARY REPRESENTATION) | | (DECIMAL REPRESENTATION) | (DECIMAL REPRESENTATION) |
| RESULT OF EQUATION (1) | Y (0) | 0 0 0 1 1 0 1 1 | EXPONENT : $\times 2^{-2}$ | 0.052734375 | 0.052734375 |
| | Y (1) | 0 0 1 0 0 1 1 0 | | 0.07421875 | 0.07470703125 |
| | Y (2) | 0 1 0 1 0 1 0 0 | | 0.1640625 | 0.1640625 |
| | Y (3) | 0 1 1 1 0 0 0 1 | | 0.220703125 | 0.22119140625 |
| | Y (4) | 0 1 0 0 1 1 0 0 | EXPONENT : $\times 2^{-1}$ | 0.296875 | 0.296875 |
| | Y (5) | 0 1 0 0 1 1 0 1 | | 0.30078125 | 0.302734375 |
| | Y (6) | 0 1 1 0 0 1 0 1 | | 0.39453125 | 0.39453125 |
| | Y (7) | 0 1 0 1 0 0 0 1 | | 0.31640625 | 0.3193359375 |
| RESULT OF EQUATION (2) | Z (0) | 0 0 0 0 0 1 1 0 | EXPONENT : $\times 2^{-3}$ | 0.005859375 | 0.006591796875 |
| | Z (1) | 0 0 0 1 1 0 0 0 | | 0.0234375 | 0.024169921875 |
| | Z (2) | 0 0 1 0 1 0 1 0 | | 0.041015625 | 0.04151916503906 |
| | Z (3) | 0 1 0 0 1 0 1 1 | | 0.0732421875 | 0.07379150390625 |
| | Z (4) | 0 0 1 1 0 0 1 0 | EXPONENT : $\times 2^{-2}$ | 0.09765625 | 0.09931945800781 |
| | Z (5) | 0 0 1 1 1 1 1 0 | | 0.12109375 | 0.121337890625 |
| | Z (6) | 0 1 0 0 0 1 0 0 | | 0.1328125 | 0.1344604492188 |
| | Z (7) | 0 1 0 0 1 1 0 1 | | 0.150390625 | 0.15087890625 |

FIG. 7

| | | RESULT OF EQUATION (1) | RESULT OF EQUATION (2) |
|---|---|---|---|
| FIXED-POINT PROCESS | | 35.2dB | 24.5dB |
| BLOCK-FLOATING-POINT | CONVERTIONAL METHOD | 35.2dB | 28.5dB |
| | METHOD ACCORDING TO PRESENT INVENTION | 46.1dB | 39.9dB |

FIG. 11(PRIOR ART)

| | BINARY REPRESENTATION | DECIMAL REPRESENTATION |
|---|---|---|
| INPUT DATA | X (0) = 0 0 1 0 1 0 0 0 | 0.315 |
| | X (1) = 0 0 1 1 0 0 1 0 | 0.390625 |
| | X (2) = 0 0 0 1 1 1 0 0 | 0.21875 |
| | X (3) = 0 0 1 0 1 0 0 0 | 0.315 |
| | X (4) = 0 0 1 1 1 0 0 0 | 0.4375 |
| | X (5) = 0 0 0 1 1 0 0 0 | 0.1875 |
| | X (6) = 0 0 1 1 1 0 0 0 | 0.4375 |
| | X (7) = 0 0 1 0 0 1 0 0 | 0.28125 |
| COEFFICIENT DATA | A (0) = 0 0 1 0 0 1 0 0 | 0.28125 |
| | A (1) = 0 0 0 1 1 0 0 0 | 0.1875 |
| | A (2) = 0 0 1 1 0 1 0 0 | 0.40625 |
| | A (3) = 0 0 0 1 1 0 0 0 | 0.1875 |
| | B (0) = 0 0 0 1 0 0 0 0 | 0.125 |
| | B (1) = 0 0 1 0 0 1 0 0 | 0.2812 |

FIG. 13(PRIOR ART)

| | | FIXED-POINT CALCULATION | | | FLOATING-POINT CALCULATION |
|---|---|---|---|---|---|
| | | OUTPUT OF MULTIPLY-ACCUMULATE OPERATION UNIT | INPUT OF DATA MEMORY | | |
| | | (BINARY REPRESENTATION) | (BINARY REPRESENTATION) | (DECIMAL REPRESENTATION) | (DECIMAL REPRESENTATION) |
| RESULT OF EQUATION (1) | Y (0) | 0 0 0 0 0 1 1 0 1 1 0 0 0 0 0 0 | 0 0 0 0 0 1 1 0 | 0.046875 | 0.052734375 |
| | Y (1) | 0 0 0 0 1 0 0 1 1 0 0 1 0 0 0 0 | 0 0 0 0 1 0 0 1 | 0.0703125 | 0.07470703125 |
| | Y (2) | 0 0 0 1 0 1 0 1 0 0 0 0 0 0 0 0 | 0 0 0 1 0 1 0 1 | 0.1640625 | 0.1640625 |
| | Y (3) | 0 0 0 1 1 1 0 0 0 1 0 1 0 0 0 0 | 0 0 0 1 1 1 0 0 | 0.21875 | 0.22119140625 |
| | Y (4) | 0 0 1 0 0 1 1 0 0 0 0 0 0 0 0 0 | 0 0 1 0 0 1 1 0 | 0.296875 | 0.296875 |
| | Y (5) | 0 0 1 0 0 1 1 0 1 1 0 0 0 0 0 0 | 0 0 1 0 0 1 1 0 | 0.296875 | 0.302734375 |
| | Y (6) | 0 0 1 1 0 0 1 0 1 0 0 0 0 0 0 0 | 0 0 1 1 0 0 1 0 | 0.390625 | 0.39453125 |
| | Y (7) | 0 0 1 0 1 0 0 0 1 1 1 0 0 0 0 0 | 0 0 1 0 1 0 0 0 | 0.3125 | 0.3193359375 |
| RESULT OF EQUATION (2) | Z (0) | 0 0 0 0 0 0 0 0 1 1 0 0 0 0 0 0 | 0 0 0 0 0 0 0 0 | 0.0 | 0.006591796875 |
| | Z (1) | 0 0 0 0 0 0 1 0 1 1 0 1 0 0 0 0 | 0 0 0 0 0 0 1 0 | 0.015625 | 0.024169921875 |
| | Z (2) | 0 0 0 0 0 1 0 1 0 0 1 0 1 0 0 0 | 0 0 0 0 0 1 0 1 | 0.0390625 | 0.04151916503906 |
| | Z (3) | 0 0 0 0 1 0 0 1 0 1 1 0 1 0 0 0 | 0 0 0 0 1 0 0 1 | 0.0703125 | 0.07379150390625 |
| | Z (4) | 0 0 0 0 1 1 0 0 1 0 1 0 0 0 0 0 | 0 0 0 0 1 1 0 0 | 0.09375 | 0.09931945800781 |
| | Z (5) | 0 0 0 0 1 1 1 1 0 1 1 1 0 0 0 0 | 0 0 0 0 1 1 1 1 | 0.1171875 | 0.121337890625 |
| | Z (6) | 0 0 0 1 0 0 0 0 1 1 1 1 0 0 0 0 | 0 0 0 1 0 0 0 0 | 0.125 | 0.1344604492188 |
| | Z (7) | 0 0 0 1 0 0 1 1 0 0 0 1 0 0 0 0 | 0 0 0 1 0 0 1 1 | 0.1484375 | 0.15087890625 |

FIG. 15(PRIOR ART)

| | | BLOCK-FLOATING-POINT OPERATION (CONVENTIONAL METHOD) | | | FLOATING-POINT CALCULATION |
|---|---|---|---|---|---|
| | | OUTPUT OF MULTIPLY-ACCUMULATE OPERATION UNIT (BINARY REPRESENTATION) | INPUT OF DATA MEMORY (BINARY REPRESENTATION) | INPUT OF DATA MEMORY (DECIMAL REPRESENTATION) | (DECIMAL REPRESENTATION) |
| STEP 1 | Y (0) | 0 0 0 0 0 1 1 0 1 1 0 0 0 0 0 0 | 0 0 0 0 0 1 1 0 | 0.046875 | 0.052734375 |
| | Y (1) | 0 0 0 0 1 0 0 1 1 0 0 1 0 0 0 0 | 0 0 0 0 1 0 0 1 | 0.0703125 | 0.07470703125 |
| | Y (2) | 0 0 0 1 0 1 0 1 0 0 0 0 0 0 0 0 | 0 0 0 1 0 1 0 1 | 0.1640625 | 0.1640625 |
| | Y (3) | 0 0 0 1 1 1 0 0 0 1 0 1 0 0 0 0 | 0 0 0 1 1 1 0 0 | 0.21875 | 0.22119140625 |
| | Y (4) | 0 0 1 0 0 1 1 0 0 0 0 0 0 0 0 0 | 0 0 1 0 0 1 1 0 | 0.296875 | 0.296875 |
| | Y (5) | 0 0 1 0 0 1 1 0 1 1 0 0 0 0 0 0 | 0 0 1 0 0 1 1 0 | 0.296875 | 0.302734375 |
| | Y (6) | 0 0 1 1 0 0 1 0 1 0 0 0 0 0 0 0 | 0 0 1 1 0 0 1 0 | 0.390625 | 0.39453125 |
| | Y (7) | 0 0 1 0 1 0 0 0 1 1 1 0 0 0 0 0 | 0 0 1 0 1 0 0 0 | 0.3125 | 0.3193359375 |
| | | | EXPONENT : $\times 2^{0}$ | | |
| STEP 2 | | BLOCK SCALE FACTOR : 1 | | | |
| STEP 3 | Z (0) | 0 0 0 0 0 0 0 1 1 0 0 0 0 0 0 0 | 0 0 0 0 0 0 0 1 | 0.00390625 | 0.006591796875 |
| | Z (1) | 0 0 0 0 0 1 0 1 1 0 1 0 0 0 0 0 | 0 0 0 0 0 1 0 1 | 0.01953125 | 0.024169921875 |
| | Z (2) | 0 0 0 0 1 0 1 0 0 1 0 1 0 0 0 0 | 0 0 0 0 1 0 1 0 | 0.0390625 | 0.04151916503906 |
| | Z (3) | 0 0 0 1 0 0 1 0 1 1 0 1 0 0 0 0 | 0 0 0 1 0 0 1 0 | 0.0703125 | 0.07379150390625 |
| | Z (4) | 0 0 0 1 1 0 0 1 0 1 0 0 0 0 0 0 | 0 0 0 1 0 0 1 0 | 0.09765625 | 0.09931945800781 |
| | Z (5) | 0 0 0 1 1 1 1 0 1 1 1 0 0 0 0 0 | 0 0 0 1 1 1 1 0 | 0.1171875 | 0.121337890625 |
| | Z (6) | 0 0 1 0 0 0 0 1 1 1 1 0 0 0 0 0 | 0 0 1 0 0 0 0 1 | 0.12890625 | 0.1344604492188 |
| | Z (7) | 0 0 1 0 0 1 1 0 0 0 1 0 0 0 0 0 | 0 0 1 0 0 1 1 0 | 0.1484375 | 0.15087890625 |
| | | | EXPONENT : $\times 2^{-1}$ | | |
| STEP 4 | | BLOCK SCALE FACTOR : 1 | | | |

DATA CALCULATING DEVICE AND METHOD FOR PROCESSING DATA IN DATA BLOCK FORM

TECHNICAL FIELD

The present invention relates to a device for processing data in a data block unit configured by obtaining a data group containing one or more pieces of data, and furthermore containing multiple data groups, and more specifically to a block-floating-point type digital signal processor (hereinafter referred to as a DSP for short) for performing a fixed-point calculation in a block-floating-point system.

BACKGROUND ART

There is fixed-point representation or floating-point representation as a method of representing a value in a digital signal processing.

In the floating-point representation, each piece of data has an exponent and a mantissa, thereby guaranteeing high precision and a wide dynamic range. However, it also has a problem of requiring complicated and large-scale hardware.

On the other hand, in the fixed-point representation, only simple and small-scale hardware is required, but there is a problem of the degradation in calculation precision. FIG. 10 shows an example of a typical conventional fixed-point type DSP. FIG. 10 actually shows a configuration of a conventional fixed-point type DSP, and the number of bits of the data in the input/output stage of each component.

As shown in FIG. 10, the conventional fixed-point type DSP includes a data memory 100 for storing data in n bit length, a multiply-accumulate operation unit 12 for receiving n bit data from the data memory 100 and outputting 2n bit calculated data, a selection circuit 13 for selecting higher n bit data from the 2n bit calculated data, and a data bus 110. The DSP reads data which is to be computed from the data memory 100, calculates the read data in the multiply-accumulate operation unit 12, selects by the selection circuit 13 the higher n bit data from the calculated data received from the multiply-accumulate operation unit 12, and stores again the calculated data from the selection circuit 13 in the data memory 100.

The multiply-accumulate operation unit 12 includes a first register file 12*a* for holding data from the data memory 100, a multiplier 12*b* for multiplying the data from the first register file 12*a*, an adder 12*c* for adding the multiplied data from the multiplier 12*b* to sum data obtained up to this time, and a register file 12*d* for holding the sum data from the adder 12*c* as calculated data.

The degradation of the calculation precision occurs by truncation of the lower n bits when the selection circuit 13 selects the n bits from the 2n bits.

The degradation of the calculation precision in the fixed-point representation is explained by using the following equations (1) and (2). That is, the multiply-accumulate operation unit 12 performs operations by the following equations (1) and (2).

For simple explanation, the data from the data memory 100 is taken as 8 bits, the output from the multiply-accumulate operation unit 12 as 16 bits, and the data X(0) to X(7) and the coefficient data A(0) to A(3), B(0), and B(1) are provided for calculation for the multiply-accumulate operation unit 12. The data X(0) to X(7) and the coefficient data A(0) to A(3), B(0), and B(1) respectively have the values as shown in FIG. 11, and X(−3)=X(−2)=X(−1)=Y(−1)=0.

Furthermore, as shown in FIG. 12, the most significant bits (MSB) of each data and coefficient data are sign bits, and a binary point is placed between the sign bit and a right adjacent bit. The right adjacent bit of the sign bit has significance of 0.5, and the decimal representation of the values of each piece of data and coefficient data is shown in FIG. 11.

FIG. 13 shows an operation result obtained when an operation is performed by the following equations (1) and (2) using the conventional fixed-point type DSP. FIG. 13 also shows an operation result (binary representation and decimal representation) finally stored in the data memory 100, the output (16-bit binary representation) of the multiply-accumulate operation unit 12 as an intermediate result, and an operation result obtained when an operation is performed using a floating-point for comparison. Since the data of lower 8 bits is lost when 8 bits are selected from 16 bits, the precision is lowered. A signal-to-noise ratio (SNR) is introduced as a scale indicating the amount of degradation in precision, and is defined by the following equation (3).

The following equation (3) shows an operation performed by dividing a sum of squares of a result of a floating-point operation result by a sum of squares of an error (difference between a result of a fixed-point operation and a result of a floating-point operation). A smaller value indicates lower precision. When the SNR is computed using the result shown in FIG. 13, the result is obtained by the following equations (4) and (5). The following equation (4) shows the SNR based on the operation result of the following equation (1). The following equation (5) shows the SNR based on the operation result of the following equation (2).

Thus, in the fixed-point representation, the precision considerably drops with the repetition of continuous operations.

The block-floating-point system has been developed to solve the above mentioned problem. In this system, a predetermined number (m, for example) of pieces of data is defined as a data block, a block scale factor is assigned to one data block, and a joint scaling (hereinafter referred to as block normalization) is performed on pieces of data in the data block, thereby reducing the degradation in precision by effectively using a limited dynamic range.

To efficiently realize the block-floating-point, for example, a DSP as shown in FIG. 14 is suggested (Japanese Patent Laid-Open No. 10-40073).

In addition to the configuration of the above mentioned conventional fixed-point type DSP, the block-floating-point type DSP includes, as shown in FIG. 14, the second shifter 10 for block-normalizing the input data to the multiply-accumulate operation unit 12 based on a given scale factor; a block scale factor detector 54 for detecting a block scale factor based on each piece of the data contained in the data block; and a block scale factor register 56 storing the block scale factor.

The block scale factor detector 54 receives the calculated data from the selection circuit 13, detects the data whose absolute value is the largest in all data of the data block, and the detected number of redundant bits is detected as a block scale factor.

When a second shifter 10 receives the block scale factor of the block scale factor register 56 from the control device not shown in the drawings, the second shifter 10 shifts bits by the amount corresponding to the block scale factor to the higher bit direction for each piece of data of the data block (hereinafter, referred to as left shift).

Next, the operations performed when the following equations (1) and (2) are used in the above mentioned conventional block-floating-point type DSP are described below.

First, the number of pieces of data contained in the data block is defined as a 'block size', and a series of processes in which each piece of data in the data block is read from the data memory 100, a multiply-accumulate operation is performed on the data, and then the calculated data which is an operation result is stored in the data memory 100 again are defined as 'block processes'.

In the following equations (1) and (2), an operation is performed by the following equation (1) with the block size of 8 and an input of the data blocks X(0) to X(7) in the first block process to obtain Y(0) to Y(7), and an operation is performed by the following equation (2) with the block size of 8 and an input of the data blocks Y(0) to Y(7) in the second block process to obtain Z(0) to Z(7). In the first block process, since the block scale factor of 0 is set in the block scale factor register 56, the block normalizing process is not performed by the second shifter 10. In the following description, the method of setting the coefficient data A(0) to A(3), B(0), and B(1) is not specifically explained, but can be read from the data memory 100 as necessary.

In the first step, the following process is performed for n=0 to 7. Data X(n), X(n-1), X(n-2) is sequentially read from the data memory 100, and input to the second shifter 10. In the first block process, since the block scale factor of the block scale factor register 56 is O, the block normalizing process is not performed by the second shifter 10, and X(n), X(n-1), X(n-2) is input as is to the multiply-accumulate operation unit 12. The multiply-accumulate operation unit 12 performs an operation by the following equation (1), and input the calculated data to the selection circuit 13. The selection circuit 13 selects and retrieves the higher n bits from the calculated data. The n-bit calculated data from the selection circuit 13 is stored in the data memory 100 as Y(n) through the data bus 110. On the other hand, in parallel with the storing process, the calculated data Y(n) is input to the block scale factor detector 54 to determine the block scale factor used in the second block process.

When the process in the first step is completed, the block scale factor detector 54 determines in the second step the block scale factor used in the second block process, and stores the determined block scale factor in the block scale factor register 56.

Then, in the third step, the following process is performed for n=0 to 7. The data Y(n), Y(n-1) is sequentially read from the data memory 100, and is input to the second shifter 10. The second shifter 10 performs the block normalizing process based on the block scale factor of the block scale factor register 56, and inputs the block-normalized data to the multiply-accumulate operation unit 12. The multiply-accumulate operation unit 12 performs an operation by the following equation (2), and inputs the calculated data to the selection circuit 13. The selection circuit 13 selects and retrieves the higher n bits from the calculated data. The n-bit calculated data from the selection circuit 13 is stored in the data memory 100 as Z(n) through the data bus 110. On the other hand, in parallel with the storing process, the calculated data Z(n) is input to the block scale factor detector 54 to determine the block scale factor used in the third block process.

When the process in the third step is completed, the block scale factor detector 54 determines in the fourth step the block scale factor used in the third block process, and stores the determined block scale factor in the block scale factor register 56.

FIG. 15 shows the operation result of the actual block-floating-point process performed by the following equations (1) and (2) after the above mentioned processes in steps 1 to 4. When the SNR is computed by the following equation (3) using the operation result, the operations are expressed by the following equations (6) and (7). The following equation (6) shows the SNR based on the operation result of the following equation (1). The following equation (7) shows the SNR based on the operation result of the following equation (2).

According to the following equations (6) and (7), the precision is furthermore improved than by simply performing the fixed-point calculation.

As shown in the above mentioned example, the conventional block-floating-point type DSP can furthermore improve the calculation precision than the conventional fixed-point type DSP, but there still remains the problem in calculation precision.

That is, since the above mentioned conventional block-floating-point type DSP cannot determine the block scale factor until the end of the block process, the selection circuit 13 selects the higher n bits, stores them in the data memory 100, and left-shifts the calculated data by the amount of the shift corresponding to the block scale factor. Therefore, the number of lower bits corresponding to the block scale factor in the data from the second shifter 10 is 0, which carries no information.

FIG. 16 shows the comparison between the ideal data and the conventional data obtained after performing a block normalizing process on the assumption that the calculated data from the multiply-accumulate operation unit 12 is 16 bits, the data from the data memory 100 is 8 bits, the calculated data is '00001101 11010101', and the block scale factor determined after the block process has been performed is '2'. In this example, the lower 2 bits of the block-normalized data are to be ideally '11', but the conventional DSP actually indicates '00'. This is a factor that hinders the calculation precision from being improved.

The present invention has been developed to solve the above mentioned problems of the conventional technology, and aims at providing a data calculating device applicable to improve the calculation precision when a fixed-point calculation is performed by the block-floating-point system.

DISCLOSURE OF INVENTION

The present invention further divides a data block, which is a data segment in conventional technology, by introducing a data group which is a new segment. That is, a data block is configured by including multiple data groups while a data group is configured by including one or more pieces of data. The number of pieces of data contained in a data group is defined as a 'group size'.

To attain the above mentioned purpose, the date calculating device of the present invention has a data group containing one or more pieces of data, and processes the data in a data block form containing multiple data groups. The device performs for each data group of the data block a series of processes of performing an operation on each piece of data of the data group, detecting the scale factor of a piece of calculated data having the largest absolute value in the calculated data as a group scale factor, and performing a scaling on each piece of the calculated data based on the detected group scale factor, detects a group scale factor corresponding to the calculated data having the largest absolute value in the detected group scale factors as a block scale factor, and performs a scaling on each piece of the calculated data of the data group based on the group scale factor of the data group and the block scale factor before performing an operation on the scaled calculated data if the operation is performed again.

With the above mentioned configuration, an operation is performed on each piece of data of the data group, the scale factor of the calculated data having the largest absolute value is detected as a group scale factor, and a scaling is performed on each piece of the calculated data based on the detected group scale factor. The series of processes are performed for each data group of the data block. When the processes are completed for one data block, the group scale factor corresponding to the calculated data having the largest absolute value in the group scale factors detected for the respective data groups is detected as a block scale factor.

When the operation is performed again on the scaled calculated data, the device performs the scaling on each piece of the calculated data of the data group based on the group scale factor of the data group and the block scale factor.

Afterwards, the operation is performed on each piece of the scaled calculated data, the scale factor of the calculated data having the largest absolute value in the calculated data is detected as a group scale factor, and a scaling is performed on each piece of calculated data based on the detected group scale factor. The series of processes are performed on each data group in a data block. When the processes are completed for one data block, a group scale factor having the largest absolute value in the group scale factors detected for the respective data groups is detected as a block scale factor.

A scale factor can be, for example, the amount of the shift in the bit shift of data. In this case, a scaling is performed by shifting bits for data by the amount of the shift corresponding to the scale factor.

The configuration for detecting a group scale factor can be designed such that after performing an operation on each piece of data in a data group, a scale factor of the calculated data can be computed, and the smallest scale factor in the computed scale factors can be detected as a group scale factor, or a group scale factor can be detected directly from the calculated data without computing the scale factors of the calculated data.

Furthermore, the data calculating device of the present invention, performs the scaling on each piece of the calculated data of the data group based on the difference between the group scale factor of the data group and the block scale factor before performing the operation when the operation is performed again on the scaled calculated data.

With the configuration, when the operation is performed again on the scaled data, a scaling is performed on each piece of the calculated data in the data group based on the difference between the group scale factor of the data group and the block scale factor.

Furthermore, the data calculating device of the present invention also includes multiple calculation units, and processes data in a data block form containing multiple data groups, the data group including one or more pieces of data. Each of the calculation units includes: first scaling means for scaling data based on a given scale factor; operation means for performing an operation on data from the first scaling means; scale factor computation means for computing a scale factor of the calculated data from the operation means; and second scaling means for scaling the calculated data from the operation means based on another given scale factor. The device further includes: storage means for storing data; group scale factor detection means for detecting a scale factor corresponding to the calculated data having the largest absolute value in the scale factors computed by the scale factor computation means of each calculation unit as a group scale factor; block scale factor detection means for detecting a group scale factor corresponding to the calculated data having the largest absolute value in the group scale factors detected by the group scale factor detection means as a block scale factor; and control means for performing control for data processing. The control means reads data from the storage means in a data block unit, and for each data group of the data block, allots the data of the data group to the first scaling means of each of the calculation units, assigns the group scale factor detected by the group scale factor detection means to the second scaling means of each of the calculation units, and stores the calculated data from the second scaling means of each of the calculation units in the storage means, and when the operation is performed again on the calculated data in the storage means, the control means, for each data group of the data block, allots the calculated data of the data group to the first scaling means of each of the calculation units, and assigns a scale factor obtained as a difference between the group scale factor of the data group and the block scale factor to the first scaling means of each of the calculation units.

With the configuration, the control means reads data in a data block unit from the storage means, and for each data group of a data block, allots the data of a data group to the first scaling means of each of the calculation units.

Since a scale factor has not been assigned to the first scaling means in the initial state in each of the calculation units, a scaling is not performed by the first scaling means, and the data is input as is to the operation means. Then, the operation means performs an operation on the data from the first scaling means, and the scale factor computation means computes a scale factor of the calculated data from the operation means.

When a scale factor is computed in each calculation unit, the group scale factor detection means detects a scale factor corresponding to the calculated data having the largest absolute value in the scale factors computed by the scale factor computation means of each calculation unit as a group scale factor, and the control means assigns the computed group scale factor to the second scaling means of each calculation unit.

Thus, in each calculation unit, the second scaling means performs a scaling on the calculated data from the operation means based on a given group scale factor.

When a scaling is performed on the calculated data in each calculation unit, the control means controls the storage means to store the calculated data from the second scaling means of each calculation unit, and the block scale factor detection means detects a group scale factor corresponding to the calculated data having the largest absolute value in the group scale factors detected by the group scale factor detection means as a block scale factor.

When the operation is performed again on the calculated data in the storage means, the control means reads the calculated data from the storage means in a data block unit, and for each data group of the data block, allots the calculated data of the data group to the first scaling means of each calculation unit, and assigns a scale factor obtained as the difference between the group scale factor of the data group and the block scale factor to the first scaling means of each calculation unit.

In each calculation unit, the first scaling means performs a scaling on the given calculated data based on the scale factor obtained as the difference between the group scale factor detected in the previous process and the block scale factor, the operation means performs an operation on the calculated data from the first scaling means, and the scale factor computation means computes the scale factor of the calculated data from the operation means.

When a scale factor is computed in each calculation unit, the group scale factor detection means detects a scale factor corresponding to the calculated data having the largest absolute value in the scale factors computed by the scale factor computation means of each calculation unit is detected as a group scale factor, and the control means assigns the computed group scale factor to the second scaling means of each calculation unit.

Thus, in each calculation unit, the second scaling means performs a scaling on the calculated data from the operation means based on the assigned group scale factor.

When a scaling is thus performed on the calculated data in each calculation unit, the control means controls the storage means to store the calculated data from the second scaling means of each calculation unit, and the block scale factor detection means detects a group scale factor corresponding to the calculated data having the largest absolute value in the group scale factors detected by the group scale factor detection means as a block scale factor.

The storage means only has to store data, store data in advance, or store data when the present device is operated.

The scale factor can be, for example, the amount of the shift in the bit shift of data. In this case, a scaling is performed by shifting bits for data by the amount of the shift corresponding to the scale factor.

Furthermore, the data calculating device of the present invention, further includes second storage means for storing the group scale factor and the block scale factor, the control means associates the group scale factor and the block scale factor with calculated data, and stores them in the second storage means, and when the operation is performed again on the calculated data in the storage means, the control means reads the corresponding group scale factor and block scale factor from the second storage means, and for each data group of the data block, allots the calculated data of the data group to the first scaling means of each calculation unit, and assigns the scale factor obtained as the difference between the group scale factor of the data group and the block scale factor to the first scaling means of each calculation unit.

With the configuration, when the operation is performed again on the calculated data in the storage means, the control means associates the group scale factor detected by the group scale factor detection means and the block scale factor detected by the block scale factor detection means with the calculated data from the second scaling means of each calculation unit and stores them in the second storage means.

When the operation is performed again on the calculated data in the storage means, the control means reads the corresponding group scale factor and block scale factor from the second storage means, and for each data group of the data block, allots the calculated data of the data group to the first scaling means of each calculation unit, and assigns the scale factor obtained as the difference between the group scale factor of the data group and the block scale factor to the first scaling means of each calculation unit.

Thus, in each calculation unit, the first scaling means performs a scaling on the given calculated data based on the scale factor obtained as the difference between the group scale factor detected in the previous process and the block scale factor.

The second storage means stores a group scale factor and a block scale factor. It is not necessary for the second storage means to store them in advance.

Furthermore, according to the data calculating device of the present invention, the scale factor computation means computes the number of redundant bits of the calculated data from the operation means, and outputs it as a scale factor.

With the configuration, the scale factor computation means computes the number of redundant bits of the calculated data from the operation means, and computes it as a scale factor.

Furthermore, according to the data calculating device of the present invention, the operation is a fixed-point operation unit, the first scaling means shifts bits for the data by the amount of the shift corresponding to a given scale factor, and the second scaling means shifts bits for the calculated data from the operation means by the amount of the shift corresponding to another given scale factor.

With the configuration, in each calculation unit, the first scaling means shifts bits for given data by the amount of the shift corresponding to the assigned scale factor, and the operation means performs a fixed-point calculation on the data from the first scaling means. Then, the second scaling means shifts bits on the calculated data from the operation means by the amount of the shift corresponding to the assigned scale factor.

The first scaling means shifts bits for data, for example, in the lower bit direction (hereinafter referred to simply as right shift). The second scaling means, for example, left-shifts or right-shifts data.

Furthermore, according to the data calculating device of the present invention, the operation means is a multiply-accumulate operation unit for computing a sum of products of the data from the first scaling means and a predetermined coefficient.

With the configuration, the operation means computes a sum of products from the first scaling means and a predetermined coefficient, and the obtained data is output as calculated data.

The outline of the present invention is shown in FIG. 1, for example. According to the present invention, a scale factor is computed for each data group as a group scale factor, the data output from the multiply-accumulate operation unit 12 is normalized (hereinafter referred to as 'group-normalized') with a group scale factor, and the group scale factor is associated with the group-normalized data group and stored in a group scale factor register file 52. The series of processes is repeatedly performed on other data groups contained in the data block. After performing the process on one data block, the smallest scale factor is detected from multiple group scale factors as a block scale factor, associated with the data block, and stored in the block scale factor register 56. When a block process is performed on the data block, there can be the possibility that the block scale factor is different from the group scale factor, and the positions of the digits are not aligned among data groups. Therefore, each data group is shifted (block-normalized) and aligned based on the difference between the group scale factor and the block scale factor, and then input to the multiply-accumulate operation unit 12.

Thus, the data obtained after the multiply-accumulate operation is temporarily group-normalized in a data group unit, stored in the data memory 100, and then block-normalized when it is used in the subsequent block process. Therefore, the lower bits of the block-normalized data does not contain meaningless information, thereby reducing the operation error when a fixed-point calculation is performed in the block-floating-point system.

As described above, the data calculating device has been suggested to attain the above mentioned purpose. However, the present invention is not limited to this application, and the following first to seventh data calculating devices can be suggested.

The first data calculating device is used to perform a digital signal processing, determines a common scale factor for a data group containing multiple pieces of data which can be divided into a mantissa and a scale using a scaling, groups multiple mantissas, and processes data by referring to the common scale factor. It determines the smallest value in multiple scale factors in the first data group as a group scale factor, scales each piece of data in the data group by referring to the group scale factor, stores each piece of the scaled data, associates the group scale factor uniquely with the data group and stores them, repeats the processes on the second and subsequent data groups, determines the smallest value in multiple group scale factors as a block scale factor of multiple data groups, associates the block scale factor uniquely with a data block containing the first and the subsequent data groups and stores them, and scales each piece of data in each of the data groups using an alignment scale factor obtained as the difference between each of the group scale factor and the block scale factor.

Furthermore, the second data calculating device is based on the first data calculating device, stores the multiple pieces of data scaled using the alignment scale factor as a new data block, and uniquely determines the alignment scale factor as the block scale factor.

The third data calculating device is based on any of the first and the second data calculating devices, and processes by the fixed-point data representation the data scaled using the alignment factor.

The fourth data calculating device is based on any of the above mentioned first to third data calculating devices, and stores the group scale factor with related data groups.

Furthermore, the fifth data calculating device processes digital data by a digital data processor having at least one calculation unit, a register, and memory for processing data, and includes: means for computing multiple scale factors from multiple pieces of data; means for generating scaled values from multiple pieces of data by referring to the scale factor, means for storing multiple scaled values as a data group (a set of scaled values); means for detecting the smallest scale factor (group scale factor) in the data group; means for storing the group scale factor, means for detecting the smallest scale factor (block scale factor) in multiple data groups; and means for storing the block scale factor.

Furthermore, the sixth data calculating device is based on the fifth data calculating device, and includes: means for temporarily storing the group scale factor using a register file; means for associating the temporarily stored group scale factor with a corresponding data group; and means for storing the group scale factor temporarily stored in the register file.

The seventh data calculating device is based on any of the fifth and sixth data calculating devices, and includes: means for detecting the smallest scale factor; means for counting redundant sign bits; and means for merging the information about the redundant sign bits.

The data calculating devices have been suggested as described above to attain the above mentioned purpose, but the present invention is not limited to these applications. A first storage medium can also be suggested to attain the above mentioned purpose.

The first storage medium is a computer-readable storage medium, stores a program for processing data in a unit of a data block which contains multiple data groups each containing one or more pieces of data, and the program directs a computer to function as the calculation unit, the first scaling means, the operation means, the scale factor computation means, the second scaling means, the group scale factor detection means, the block scale factor detection means, and the control means.

With the configuration, the information stored in a storage medium is read by a computer, and the operation performed by the data calculating device of the present invention can be performed when the computer functions as each of these means.

BRIEF DESCRIPTION OF THE DRAWINGS

FIG. 3 shows a multiply-accumulate operation performed by each multiply-accumulate operation unit 12;

FIG. 4 shows a process of the operation performed when the present invention is applied to an example of values;

FIG. 5 shows an example of a method of associating a data group with a group scale factor and storing them;

FIG. 6 shows an operation result obtained when the present invention is applied to an example of values;

FIG. 7 shows a comparison in calculation precision between the system according to the present invention and the conventional system;

FIG. 11 shows values of data used in an example of values;

FIG. 13 shows an operation result of an example of values by the conventional fixed-point type DSP;

FIG. 15 shows an operation result of an example of values by the conventional block-floating-point type DSP.

BEST MODE FOR CARRYING OUT THE INVENTION

Embodiments of the present invention will be described below by referring to the attached drawings. FIGS. 1 through 9 show the embodiments of the data calculating device according to the present invention.

Figure 1:
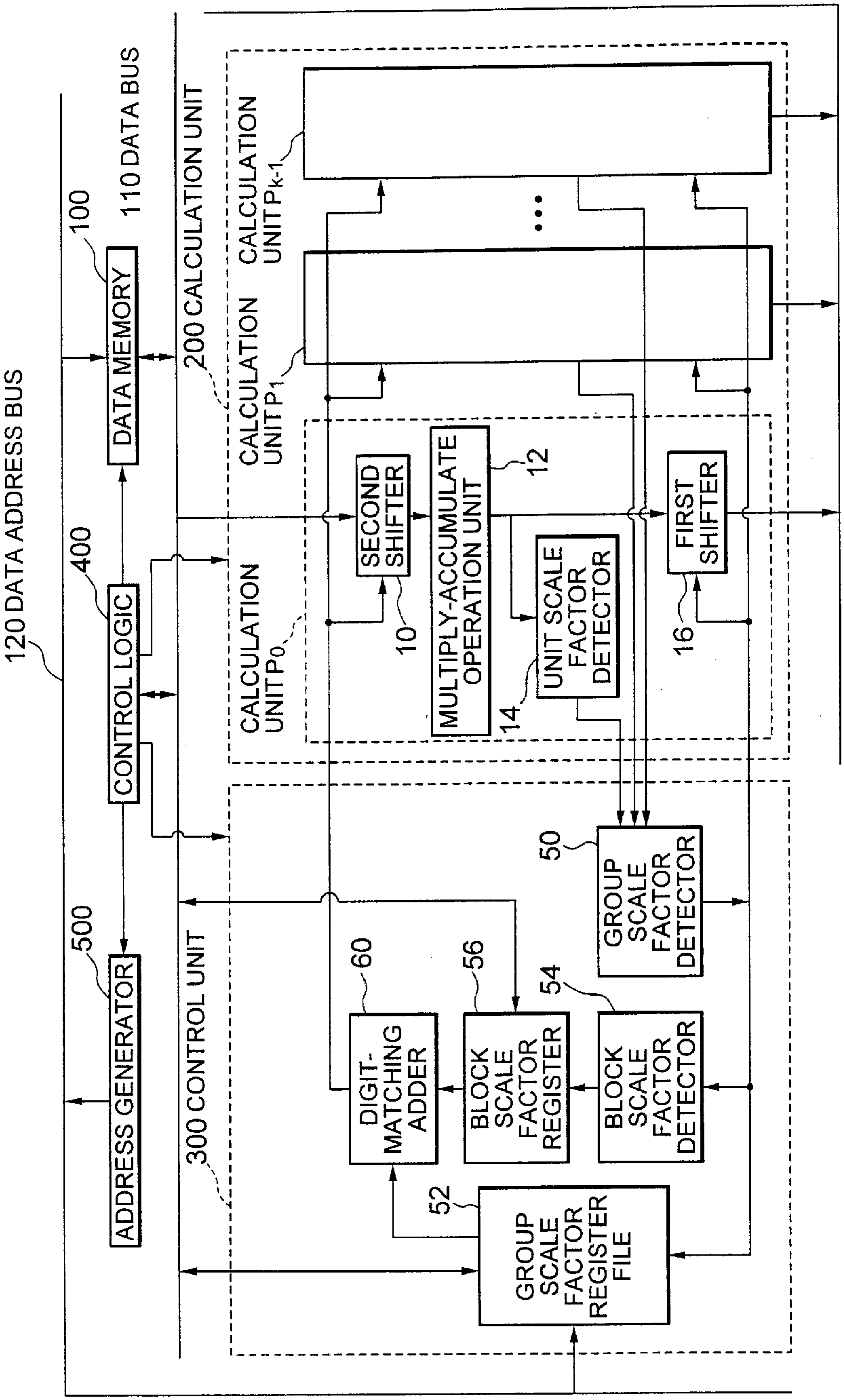
FIG. 1 is a block diagram of a configuration of a data calculating device according to the present invention.

First, the configuration of the data calculating device of the present invention is described below by referring to FIG. 1. FIG. 1 is a block diagram of the configuration of the data calculating device according to the present invention.

As shown in FIG. 1, the data calculating device according to the present invention comprises: the data memory 100 for storing data in a data block unit; a calculation unit 200 for performing a multiply-accumulate operation on the data in the data memory 100; a control unit 300 for performing a normalizing process required for block-floating-point; a control logic 400 for controlling the processes; and an address generator 500. The data memory 100, the calculation unit 200, the control unit 300, and the control logic 400 are interconnected through a data bus 110 such that they can transmit and receive data among them. The data memory 100, the control unit 300, and the address generator 500 are interconnected through a data address bus 120 such that they can transmit and receive data among them.

Figure 2:
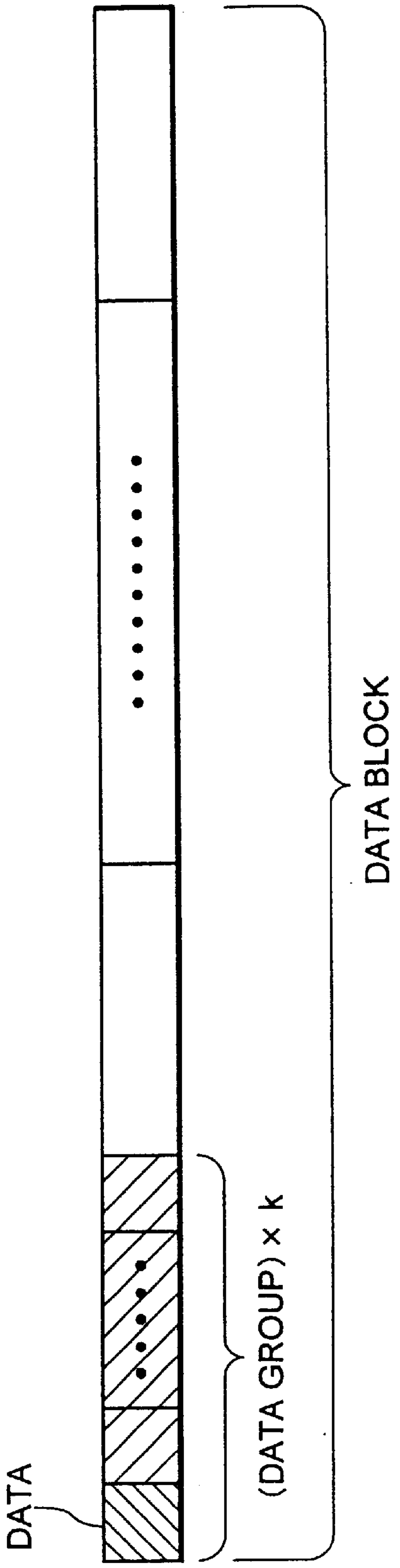
FIG. 2 shows a data structure in a data memory 100.

The data memory 100 externally inputs data although it is not shown in the attached drawings, and stores it as the data to be processed by the calculation unit 200. The data memory 100 stores data in a data block unit as shown in FIG. 2. FIG. 2 shows the data structure in the data memory 100. The data memory 100 stores data as a data group obtained by grouping a number of pieces of data (k in this example) equal to the number of calculation units, and furthermore stores data as a data block obtained by grouping multiple data groups. That is, a data block comprises multiple data groups, and a data group comprises pieces of data the number of which is equal to the number of the calculation units.

The calculation unit 200 comprises k calculation units $P_0$ to $P_{k-1}$ each of which has the same function as each other. The data of one data group is allotted to each of the calculation units $P_0$ to $P_{k-1}$, which process data in parallel in a data group unit.

Each of the calculation units $P_0$ to $P_{k-1}$ is constituted by: the second shifter 10 for scaling data based on a given scale factor; the multiply-accumulate operation unit 12 for performing a multiply-accumulate operation on the data from the second shifter; a unit scale factor detector 14 for calculating a scale factor of the calculated data from the multiply-accumulate operation unit 12; and a first shifter 16 for scaling the calculated data from the multiply-accumulate operation unit 12 based on the given scale factor.

The unit scale factor detector 14 calculates the number of redundant bits of the calculated data from the multiply-accumulate operation unit, and outputs it as a scale factor. According to the present embodiment, the scale factor refers to the amount of shift when data is bit-shifted, and indicates the number of bits to be shifted. This holds true with a group scale factor and a block scale factor.

The second shifter 10 shifts given data to the right by the amount of the shift corresponding to a given scale factor. The first shifter 16 shifts the calculated data from the multiply-accumulate operation unit 12 to the left by corresponding to the given scale factor.

The control unit 300 comprises: the group scale factor detector 50 for detecting a group scale factor from the scale factor calculated by the unit scale factor detector 14; the group scale factor register file 52 for storing a group scale factor; the block scale factor detector 54 for detecting a block scale factor from the group scale factor; the block scale factor register 56 for storing the block scale factor; and a digit-matching adder 60 for calculating the difference between the group scale factor and the block scale factor.

The group scale factor detector 50 detects the smallest scale factor in the scale factors calculated by the unit scale factor detector 14 in each of the calculation units $P_0$ to $P_{k-1}$ as a group scale factor, and outputs the detected group scale factor to the group scale factor register file 52 and the first shifter 16 of each of the calculation units $P_0$ to $P_{k-1}$. For example, when '1', '2', and '3' are input from the unit scale factor detector 14 of each of the calculation units $P_0$ to $P_{k-1}$ (for example, k=3) as scale factors, the smallest value of 1 is detected as a group scale factor.

The group scale factor register file 52 temporarily stores the group scale factor detected by the group scale factor detector 50, and outputs the group scale factor to the data memory 100 or the digit-matching adder 60 by the control of the control logic 400.

The block scale factor detector 54 detects the smallest group scale factor in the group scale factors detected by the group scale factor detector 50 as a block scale factor. For example, when a group scale factor of a data block is detected as '3', '4', and '5', the smallest value of 3 is detected as the block scale factor.

The block scale factor register 56 temporarily stores the block scale factor detected by the block scale factor detector 54, and outputs a group scale factor to the data memory 100 or the digit-matching adder 60 by the control of the control logic 400.

The digit-matching adder 60 inputs the group scale factor output from the group scale factor register file 52, and the block scale factor output from the block scale factor register 56, calculates the difference between them by subtracting the block scale factor from the group scale factor, and outputs the scale factor obtained as the difference from the second shifter 10 of each of the calculation units $P_0$ to $P_{k-1}$, by the control of the control logic 400.

The control logic 400 performs the following control process when an operation is first performed on the data in the data memory 100.

First, the data is read from the data memory 100 in a data block unit, and allots the data of a data group to the second shifter 10 of each of the calculation units $P_0$ to $P_{k-1}$ through the data bus 110 for each data group of the data block.

Then, the group scale factor detected by the group scale factor detector 50 is assigned to the first shifter 16 of each of the calculation units $P_0$ to $P_{k-1}$, and the calculated data from the first shifter 16 of each of the calculation units $P_0$ to $P_{k-1}$is stored in the data memory 100 through the data bus 110.

The control logic 400 performs the following control process when an operation is performed again on the data in the data memory 100.

First, the calculated data is read from the data memory 100 in a data block unit, and allots the calculated data of a data group to the second shifter 10 of each of the calculation units $P_0$ to $P_{k-1}$ through the data bus 110 for each data group of the data block. Simultaneously, when the group scale factor provided for the second shifter 10 of each of the calculation units $P_0$ to $P_{k-1}$.and the block scale factor are stored in the group scale factor register file 52 and the block scale factor register 56, the block scale factor is read from the block scale factor register 56 and provided for the digit-matching adder 60, the group scale factors are sequentially read from the group scale factor register file 52 and provided for the digit-matching adder 60, the digit-matching adder 60 computes the difference between each group scale factor and the block scale factor, and the scale factor obtained as the difference is provided for the second shifter 10 of each of the calculation units $P_0$ to $P_{k-1}$.

Then, the group scale factor detected by the group scale factor detector 50 is provided for the first shifter 16 of each of the calculation units $P_0$ to $P_{k-1}$, and the calculated data from the first shifter 16 of each of the calculation units $P_0$ to $P_{k-1}$ is stored in the data memory 100 through the data bus 110.

When the group scale factor provided for the second shifter 10 of each of the calculation units $P_0$ to $P_{k-1}$ and the block scale factor are not stored in the group scale factor register file 52 and the block scale factor register 56, the group scale factor corresponding to the data provided for the second shifter 10 of each of the calculation units $P_0$ to $P_{k-1}$ and the block scale factor are read from the data memory 100, and stored in the group scale factor register file 52 and the block scale factor register 56 through the data bus 110, and then the above mentioned processes are performed.

Then, the operations in the above mentioned embodiment are described below by referring to FIGS. 3 to 7. Actually, the following equations (1) and (2) are used for examples. In the examples, it is assumed that the data from the data memory 100 is 8 bits, and the output of the multiply-accumulate operation unit 12 is 16 bits.

According to the present embodiment, it is assumed that the calculation unit 200 comprises four calculation units, a data block contains two data groups, and a data group contains four pieces of data. Furthermore, it is assumed that predetermined coefficient data A(0) to A(3), B(0), and B(1) are available at any time as necessary. The method of providing the coefficient data is not described here because it is not important for the present invention. However, it is assumed that the data can be provided for the multiply-accumulate operation unit 12 by reading it from the data memory 100 as necessary.

First, the procedure of performing a parallel process on data in the data calculating device according to the present invention is briefly described below by referring to FIG. 3. FIG. 3 shows a multiply-accumulate operation performed by each multiply-accumulate operation unit 12.

Figure 14:
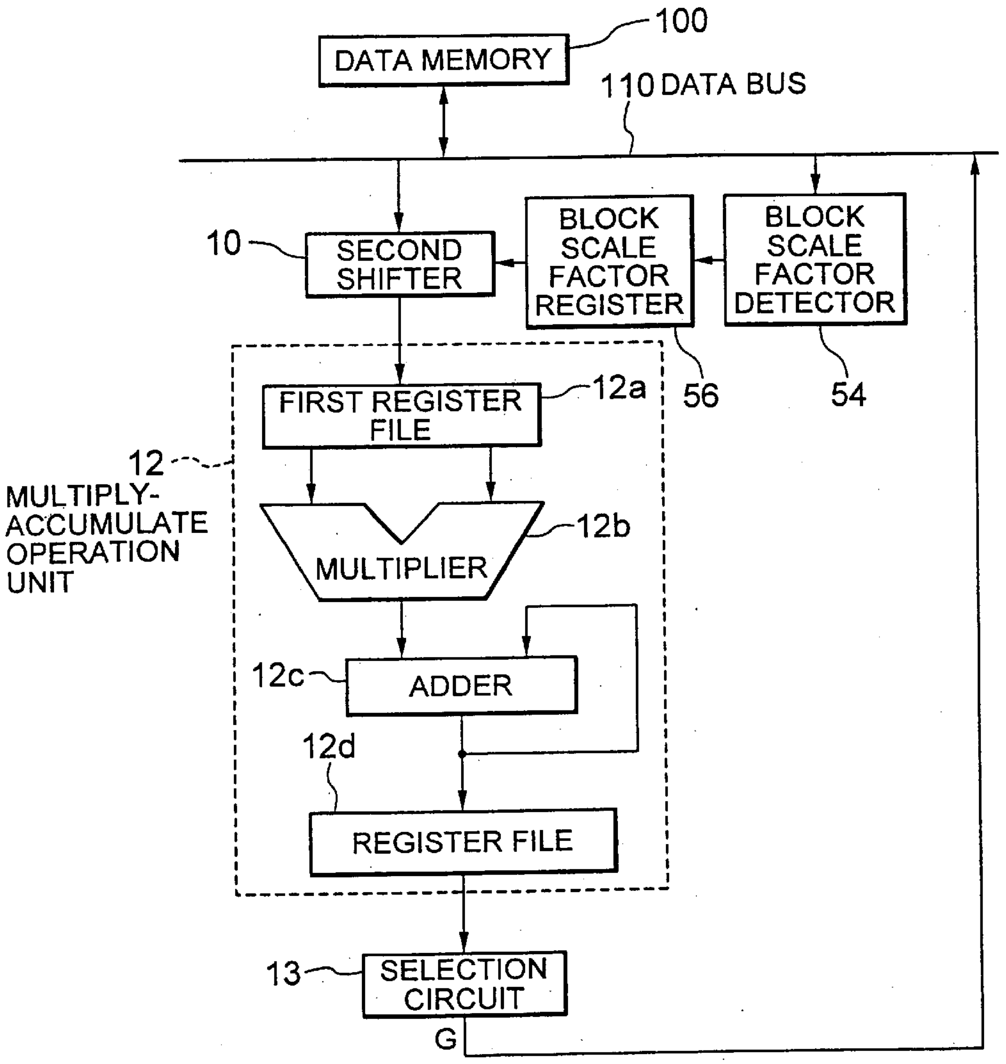
FIG. 14 is a block diagram of the configuration of the conventional block-floating-point type DSP.
Figure 16:
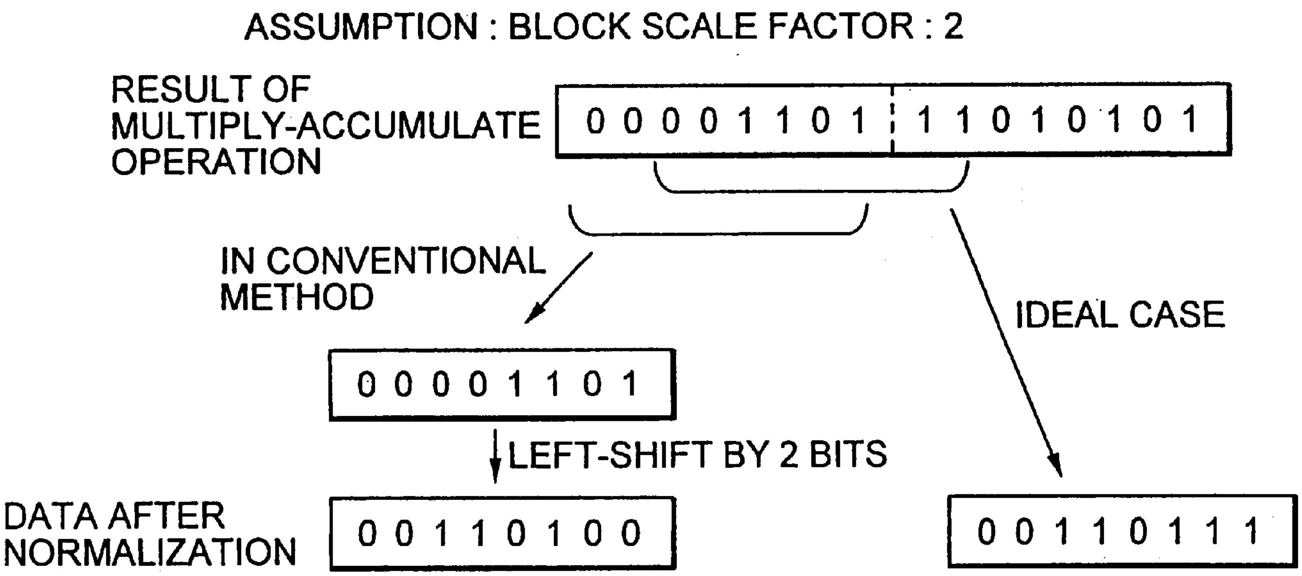
FIG. 16 shows a problem of the conventional method.

When an operation is performed on the data in the data memory 100 by the following equation (1), the first data group containing data X(0) to X(3) is first read from the data memory 100 in cycle 1, and each piece of the data X(0) to X(3) is allotted to the second shifter 10 of each of the calculation units $P_0$ to $P_3$ through the data bus 110. At this time, the data X(0) to X(3) do not contain information about a scale. Therefore, the control logic 400 controls the second shifter 10 such that the data X(0) to X(3) are not shifted. It is assumed that the means for holding the data in the multiply-accumulate operation unit 12 (for example, the first register file of the multiply-accumulate operation unit 12 shown in FIG. 14) is available. Since such holding means does not relate to the present invention, it is not shown in FIG. 1.

Each multiply-accumulate operation unit 12 performs a multiply-accumulate operation between the coefficient data A(0) to A(3) and the data X(0) to X(3) in the procedure shown in FIG. 3, and the calculated data Y(0) to Y(3) are obtained as the results of the first multiply-accumulate operation in cycles 2 to 5. In the operation process, the data X(0) to X(3) are transmitted among the calculation units $P_0$ to $P_{k-1}$ through hardware means.

The calculated data Y(0) to Y(3) are then input to the unit scale factor detector 14. Each of the unit scale factor detectors 14 calculates the number of redundant bits of the calculated data from the multiply-accumulate operation unit 12, and outputs as a scale factor. In this calculation, for example, data '00001100' in the calculated data Y(0) to Y(3) is scaled into '01100000'. In this case, since the number redundant bits is 3, the scale factor is 3.

Multiple scale factors calculated by the unit scale factor detector 14 is then input to the group scale factor detector 50, and the smallest scale factor in multiple scale factors is detected as a group scale factor.

The group scale factor is input to the first shifter 16 of each of the calculation units $P_0$ to $P_3$. Simultaneously, the calculated data Y(0) to Y(3) from the multiply-accumulate operation unit 12 are also input to the first shifter 16. According to the group scale factor, the first shifter 16 group-normalizes 16 bits of the calculated data Y(0) to Y(3). FIG. 4 shows an example of a calculation result using an actual value.

The group-normalized calculated data is stored in the data memory 100 to be prepared for the subsequent block process. Since the number of bits of the data in the data memory 100 is smaller than that of the calculated data, the lower 8 bits of each piece of the calculated data is truncated and rounded into 8-bit calculated data. The rounded calculated data Y(0) to Y(3) are displayed in the input column of the data memory 100 in FIG. 4. When the calculated data Y(0) to Y(3) are stored in the data memory 100, the group scale factor is also input to the group scale factor register file 52. The group scale factor is associated with corresponding data group, and is stored in the group scale factor register file 52. For example, when a data group is stored in the data memory 100, a memory address is obtained, and, on the assumption that all data in the data group are simultaneously accessed by one memory address, the data group is stored in a register specified by the address at which the calculated data is stored in the data memory 100. Otherwise, as shown in FIG. 5, the correspondence table between the address of the data memory 100 storing the data group and the address of the group scale factor register file 52 storing the group scale factor can be generated in a part of the data memory 100 to manage the addresses.

The group scale factor is also input to the block scale factor detector 54, and the smallest value in multiple group scale factors is detected as a block scale factor. After the first data group in a data block has been calculated, the group scale factor which has just been calculated, that is, the value of 2 in the example shown in FIG. 4 is stored as the initial value in the register (not shown in FIG. 1) in the block scale factor detector 54.

Then, in cycle 6, the second data group containing the data X(4) to X(7) is read from the data memory 100, and the data X(4) to X(7) is allotted to the second shifter 10 of each of the calculation units $P_0$ to $P_3$. The operation process similar to that on the first data group is also performed on this data group. The only difference is that the group scale factor calculated on the data Y(4) to Y(7) is compared with the contents held in the register in the block scale factor detector 54, and the smaller value is selected as a block scale factor. In the example shown in FIG. 4, the group scale factor of 1 is detected from the calculated data Y(4) to Y(7). In this case, since 1 is smaller than 2 held in the block scale factor detector 54, the contents of the register in the block scale factor detector 54 are updated.

In this example, since the operations on all data in one data block have been completed at this time, the block scale actor is set to the current value of the register in the block scale factor detector 54, that is, 1. As it can be easily assumed from this example, the above mentioned process applied to the second data group can be repeated although there are multiple data groups to be calculated.

Then, the signal processing by the following equation (2) is started. Before starting the operation, the contents of the register in the block scale factor detector 54 are transferred to the block scale factor register 56.

When operations are performed again on the calculated data in the data memory 100 by the following equation (2), the first data group containing the calculated data Y(0) to Y(3) is read from the data memory 100, and each piece of the calculated data Y(0) to Y(3) is allotted to the second shifter 10 of each of the calculation units $P_0$ to $P_{k-1}$ via the data bus 110. Simultaneously, a corresponding group scale factor, that is, '2' in this example, is selected according to the address information provided through the data address bus 120, and is read from the group scale factor register file 52. The amount of the right shift in the second shifter 10 is assigned as the difference between the current group scale factor and the block scale factor, that is, 2−1=1 in this example. Therefore, the second shifter 10 is controlled such that the current input can be right shifted by 1 bit. The operations process hereinafter applied to the calculated data Y(0) to Y(3) is the same as the operations process described about the following equation (1).

Then, the second data group containing the calculated data Y(4) to Y(7) is read from the data memory 100, and the calculated data Y(4) to Y(7) is allotted to the second shifter 10 of each of the calculation units $P_0$ to $P_3$ through the data bus 110. The group scale factor to the data group is 1 as shown in FIG. 4. As a result, all calculated data of the data group is 1−1=0, that is, it is not shifted by the second shifter 10 and output as is.

At this stage, all calculated data Y(0) to Y(7) is aligned at the position of the maximum decimal point value. As a result, a fixed-point calculation can be performed in the subsequent multiply-accumulate operation.

FIG. 6 shows the calculated data Y(0) to Y(7), and Z(0) to Z(7). Using the operation result, the SNR is calculated by the following equation (3), and the operations are performed as shown in the following equations (8) and (9). The following equation (8) is an equation for the SNR based on the operation result of the following equation (1), and the following equation (9) is an equation for the SNR based on the equation result of the following equation (2).

FIG. 7 collectively shows the SNRs obtained when the conventional fixed-point process, the conventional block-floating-point process, and the block-floating-point process according to the present invention are performed by the following equations (1) and (2). In FIG. 7, it is clear that the calculation precision has been greatly improved in the block-floating-point process according to the present invention.

Thus, in the present embodiment, a calculating process is performed on each piece of data of a data group, and the smallest scale factor representing the calculated data is detected as a group scale factor, a series of processes for scaling each piece of calculated data using the detected group scale factor is performed on each data group of a data block, and the smallest value of the detected group scale factors is detected as a block scale factor. When scaled calculated data is subject to an operations process again, a scaling is performed on each piece of calculated data of a data group before performing the operations based on the group scale factor of the data group and the block scale factor.

Thus, the calculated data from the multiply-accumulate operation unit 12 is rounded after being left-shifted by the number of redundant bits for the largest absolute value of the calculated data of the data group, and the calculated data of the data memory 100 is calculated after the alignment is performed on the position of the decimal point of the largest positive value of the calculated data of the data block (the calculated data from the multiply-accumulate operation unit 12 in the previous operations) when the calculating process is performed again on the calculated data. Therefore, lost digits of data can be reduced in an operations process. Since only a small adding or changing process is performed on a circuit with the conventional configuration, the circuit can be easily configured. As a result, calculation precision can be improved in a fixed-point calculation in the block-floating-point system with an easier configuration than the conventional system.

According to the present embodiment, the data calculating device comprises multiple calculation units $P_0$ to $P_{k-1}$to perform a parallel process on data in a data group unit. Thus, the calculation precision can be improved when a fixed-point calculation is performed in a block-floating-point system, and data can be calculated at a high speed.

Figure 8:
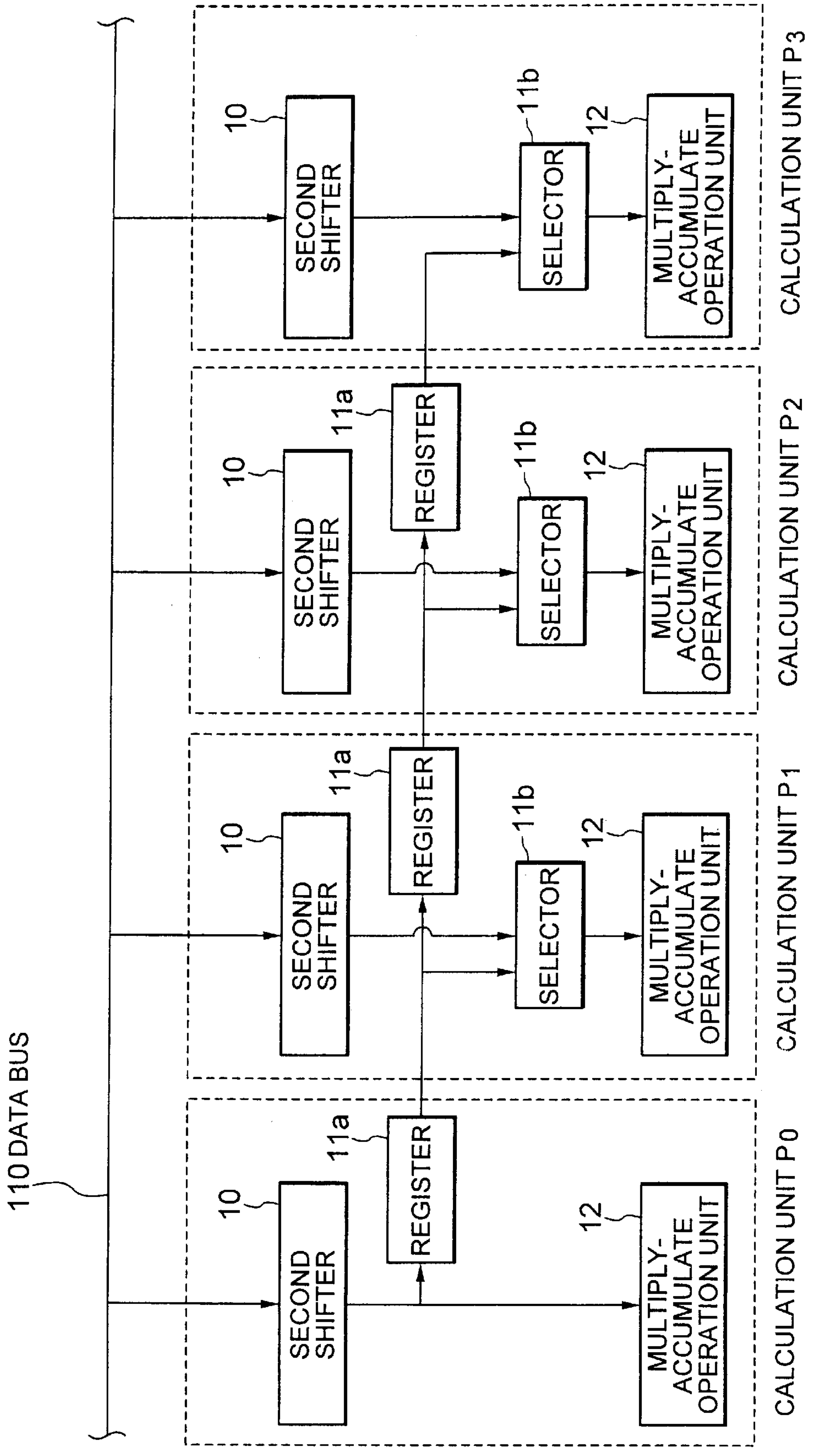
FIG. 8 is a block diagram of the detailed configuration for transmitting data between the second shifter 10 and the multiply-accumulate operation unit 12 of each of the calculation units $P_0$ to $P_{k-1}$.

In the above mentioned present embodiment, data is transferred between the second shifter 10 of each of the calculation units $P_0$ to $P_{k-1}$and the multiply-accumulate operation unit 12 through hardware means, but the configuration can be practically obtained as shown in FIG. 8. FIG. 8 is a block diagram of the detailed configuration for transferring data between the second shifter 10 of each of the calculation units $P_0$ to $P_{k-1}$and the multiply-accumulate operation unit 12.

In FIG. 8, the calculation unit $P_0$ comprises a register 11*a* for holding the data from the second shifter 10. The calculation units $P_1$ and $P_2$ comprise the register 11*a* for holding the data from the register 11*a* of the calculation units $P_0$ and $P_1$ at the previous stage; and a selector 11*b* for selecting either the data from the register 11*a* of the calculation units $P_0$ and $P_1$ at the previous stage or the data from the second shifter 10, and outputting the selected data to the multiply-accumulate operation unit 12. The calculation unit $P_3$ comprises a selector 11*b* for selecting either the data from the register 11*a* of the calculation unit $P_2$ at the previous stage or the data from the multiply-accumulate operation unit 12, and outputting the selected data to the multiply-accumulate operation unit 12.

Figure 9:
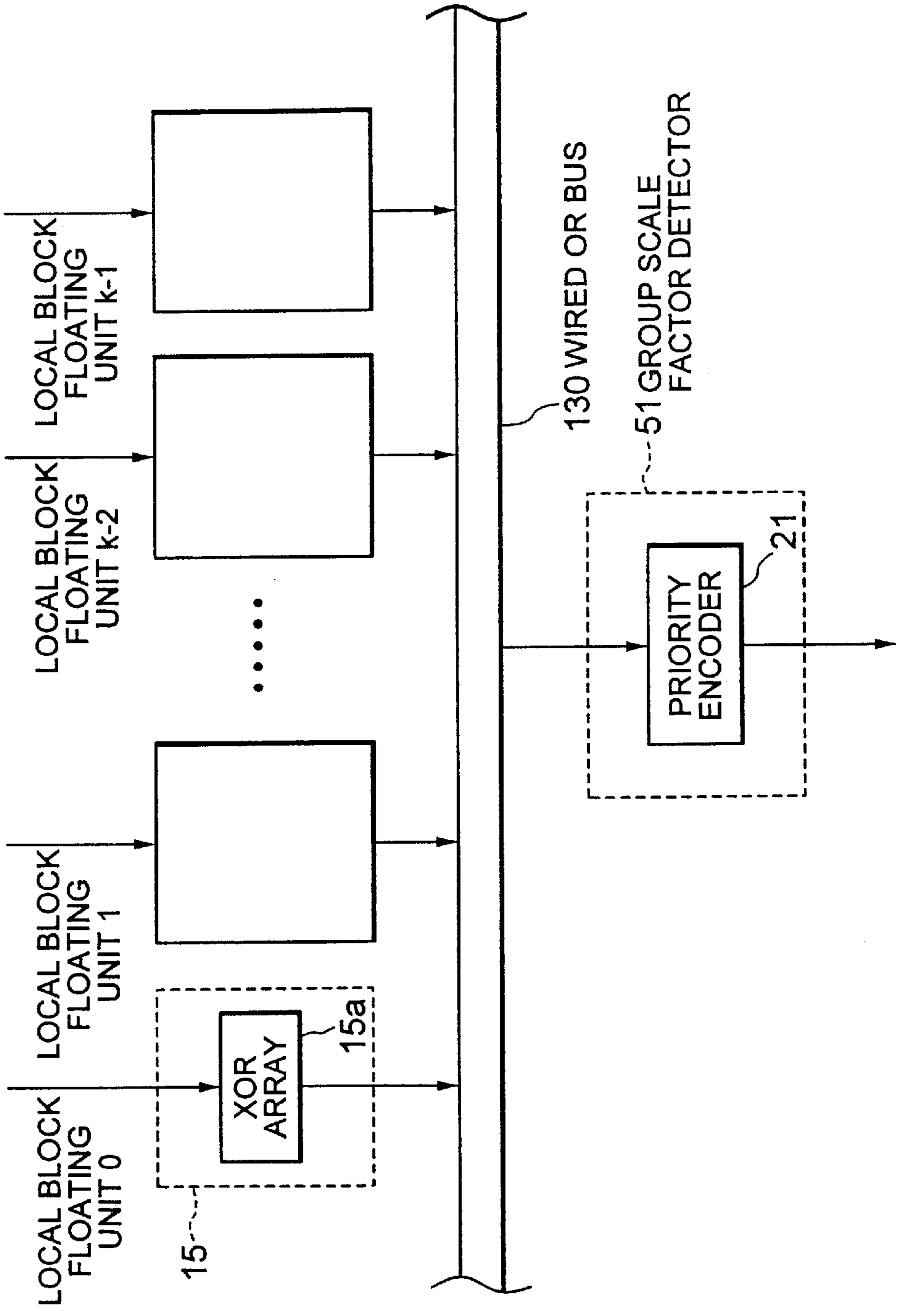
FIG. 9 is a block diagram of another configuration of the unit scale factor detector 14 and a group scale factor detector 50.
Figure 10:
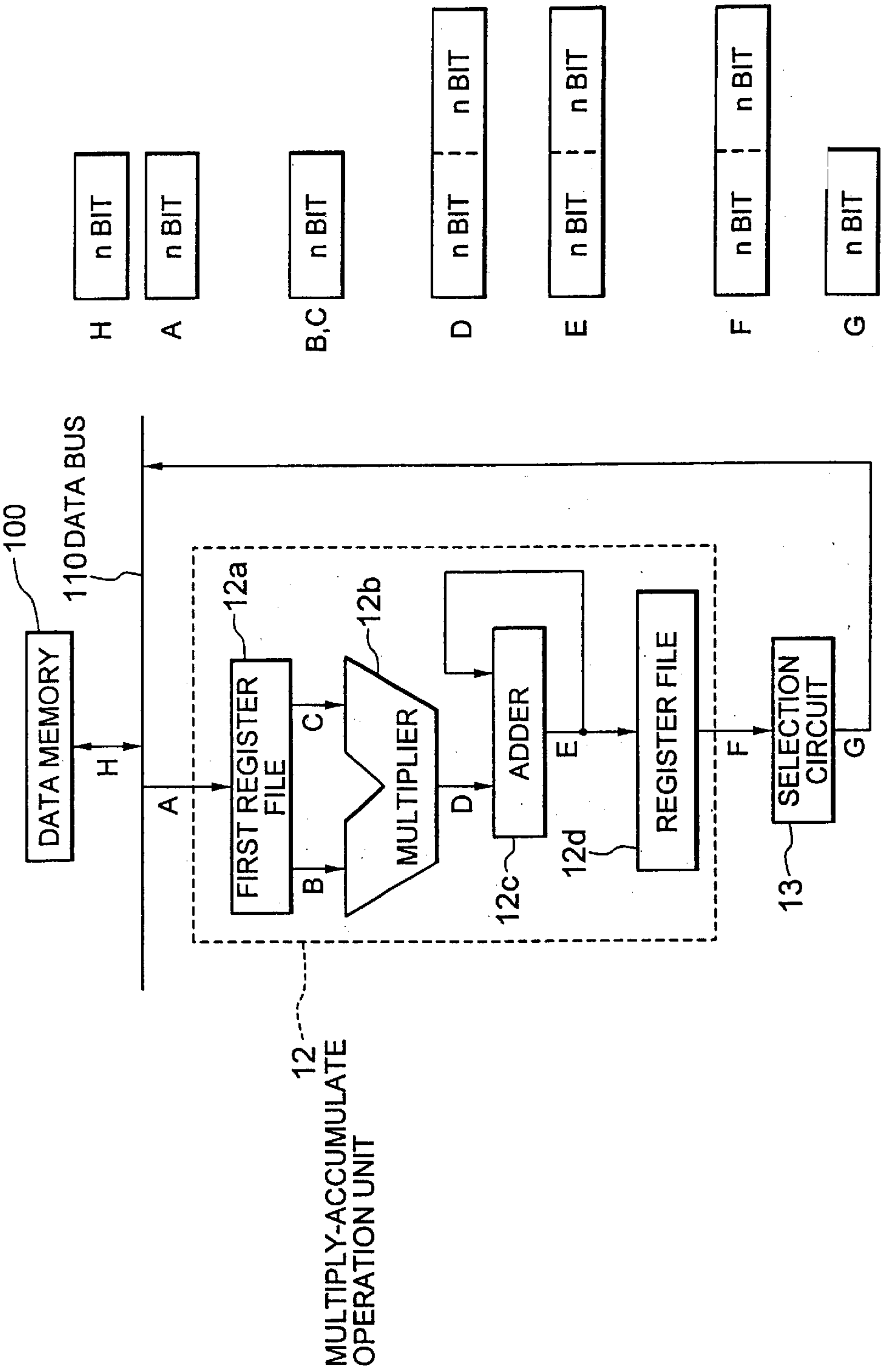
FIG. 10 shows a configuration of the conventional fixed-point type DSP, and the number of bits of the data in the input/output stage of each component.
Figure 12:
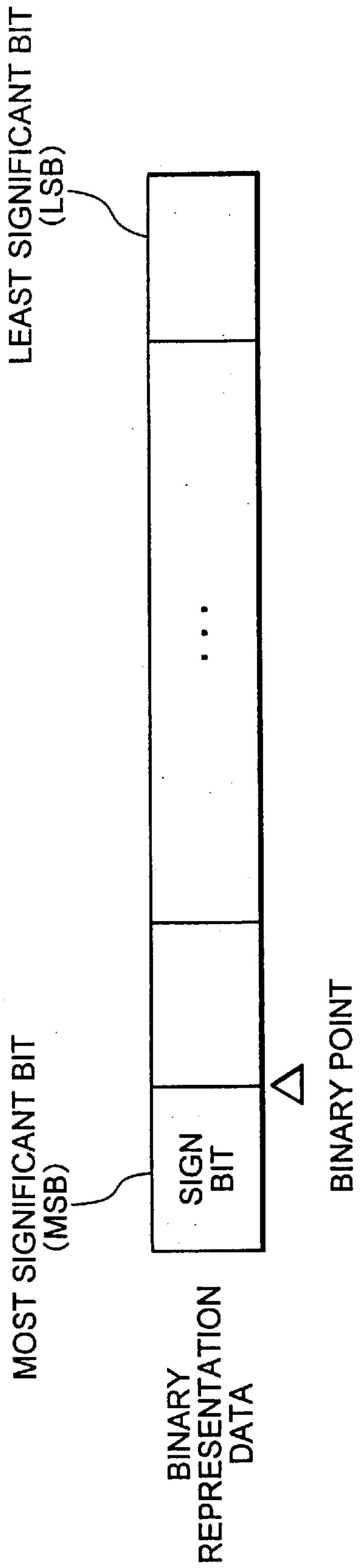
FIG. 12 shows the fixed-point representation of the data used in an example of values.

According to the above mentioned embodiment, the data calculating device comprises the unit scale factor detector 14 and the group scale factor detector 50. However, the present invention is not limited to this configuration. For example, the configuration shown in FIG. 9 can be adopted. FIG. 9 is a block diagram of another configuration of the unit scale factor detector 14 and the group scale factor detector 50.

In FIG. 9, each of the calculation units $P_0$ to $P_4$ is configured by replacing the unit scale factor detector 14 with a local block-floating-point unit 15 comprising an XOR array 15*a*. It further comprises a group scale factor detector 51 comprising a priority encoder 21, and a wired OR bus for connecting the local block-floating-point unit 15 of each of the calculation units $P_0$ to $P_4$ to the group scale factor detector 51.

The local block-floating-point unit 15 inputs the calculated data from the multiply-accumulate operation unit 12, performs an exclusive logical OR operation on adjacent bits of the calculated data, and outputs the result. For example, when 4-bit calculated data is input, a result obtained by performing an exclusive logical or operation on the fourth and third most significant bits is defined as the third bit of the output data. Similarly, the third and second operation results are defined as the second bit of the output data, the second and the first operation results are defined as the first bit of the output data, and the most significant bit is output as the most significant bit of the output data.

Thus, a group scale factor can be detected directly from the calculated data from the multiply-accumulate operation computing the scale factor of the calculated data from the multiply-accumulate operation unit 12 of each of the calculation units $P_0$ to $P_4$ and then a group scale factor from the scale factors.

In the above mentioned embodiment, the present invention is applied in performing arithmetic operations, but it is not limited to this application, and can be applicable within a range of the gist of the present invention.

In the above mentioned embodiment, the control logic 400 is configured to control each unit according to an internal logic, but the present invention is not limited to this configuration, and the data calculating device can be configured by connecting a CPU, RAM, and ROM instead of the control logic 400 through a bus, and to read a program describing the above mentioned control procedure from the ROM, and then execute the program with the CPU. In this case, although the program describing the control procedure is stored in the ROM, the present invention is not limited to this, and a program describing the above mentioned control procedure can be read to the RAM for execution from a storage medium storing the program.

In the above mentioned embodiment, the data calculating device according to the present invention is configured by hardware comprising the data memory 100, the calculation unit 200, the control unit 300, the control logic 400, and the address generator 500. However, the device is not limited to this configuration, but a CPU, RAM, and ROM can be connected through a bus to configure the device totally or partly by software such that the CPU can read a control program for realizing the function of each unit from the ROM for execution, for example. Also in this case, the control program is stored in the ROM, but the control program can be stored in a storage medium and read to the RAM for execution.

In this example, a storage medium can be a semiconductor storage medium such as RAM, ROM, etc., a magnetic storage medium such as an FD, an HD, etc., an optical read system storage medium such as a CD, a CDV, an LD, a DVD, etc., and a magnetic storage type/optical reading system storage medium such as an MO, etc., and includes all storage media as long as it is a computer-readable storage medium regardless of a method of reading data by electronic, magnetic, optical, etc.

In the above mentioned embodiment, the data memory 100 corresponds to the storage medium, and the group scale factor register file 52 and the block scale factor register 56 correspond to the second storage medium.

The second shifter 10 corresponds to the first scaling means, the multiply-accumulate operation unit 12 corresponds to the operation unit, the unit scale factor detector 14 corresponds to the scale factor computation means and, the first shifter 16 corresponds to the second scaling means.

The group scale factor detector 50 corresponds to the group scale factor detection means, the block scale factor detector 54 corresponds to the block scale factor detection means, and the control logic 400 corresponds to the control means.

$$Y(n) = \sum_{k=0}^{3} A(k) \times X(n-k) \tag{1}$$

$$Z(m) = \sum_{1=0}^{1} B(l) \times X(m-1) \tag{2}$$

$$SNR = 10 \times \log \frac{\left( \sum_{n=1}^{\substack{\text{number of}\\ \text{pieces of}\\ \text{data}}} (n\text{-}th \text{ floating-point operation result})^2 \right)}{\left( \sum_{n=1}^{\substack{\text{number of}\\ \text{pieces of}\\ \text{data}}} (n\text{-}th \text{ fixed-point operation result} - n\text{-}th \text{ floating-point operation result})^2 \right)} \tag{3}$$

$$SNR = 10 \times \log \frac{0.521617412567}{1.5592575073 24e-4} = 35.2\text{dB} \tag{4}$$

$$SNR = 10 \times \log \frac{0.073227959219}{2.610855735586e-4} = 24.5\text{dB} \tag{5}$$

$$SNR = 10 \times \log \frac{0.521617412567}{1.5592575073 24e-4} = 35.2\text{dB} \tag{6}$$

$$SNR = 10 \times \log \frac{0.073227959219}{0.0001036697 06719} = 28.5\text{dB} \tag{7}$$

$$SNR = 10 \times \log \frac{0.521617412567}{1.287460327148e-5} = 46.1\text{dB} \tag{8}$$

$$SNR = 10 \times \log \frac{0.073227959219}{7.408205414267e-6} = 39.9\text{dB} \tag{9}$$

INDUSTRIAL APPLICABILITY

As described above, according to the data calculating device of the present invention, calculation precision can be improved with an easy configuration in a fixed-point calculation from the conventional system.

Furthermore, with the data calculating device of the present invention, the calculation precision can be improved when a fixed-point calculation is performed in a block-floating-point system, and data can be calculated at a high speed.

What is claimed is:

1. A data calculating method for processing data in a data block form containing multiple data groups, the data group including one or more pieces of data, comprising:

performing for each data group of said data block a series of processes including:

performing an operation on each piece of data of said data group, detecting a scale factor of a piece of calculated data having a largest absolute value in the calculated data as a group scale factor, and performing a scaling on each piece of said calculated data based on the detected group scale factor and detecting a block scale factor corresponding to the calculated data having a largest absolute value in the detected group scale factors; and wherein, upon an operation being performed again on the scaled calculated data, performing a scaling on each piece of the calculated data of said data group based on the group scale factor of said data group and the block scale factor before performing the operation.

2. The data calculating method according to claim 1, wherein, when an operation is performed again on the scaled calculated data, said device performs the scaling on each piece of the calculated data of said data group based on a difference between the group scale factor of said data group and the block scale factor before performing the operation.

3. A data calculating device including multiple calculation units for processing data in a data block form containing multiple data groups, the data group including one or more pieces of data, comprising:

each of the calculation units includes: first scaling means for scaling data based on a given scale factor; operation means for performing an operation on data from the first scaling means; scale factor computation means for computing a scale factor of the calculated data from the operation means; and second scaling means for scaling the calculated data from the operation means based on another given scale factor, said device further includes: storage means for storing data; group scale factor detection means for detecting a scale factor corresponding to the calculated data having a largest absolute value in the scale factors computed by the scale factor computation means of each calculation unit as a group scale factor; block scale factor detection means for detecting a group scale factor corresponding to the calculated data having a largest absolute value in the group scale factors detected by the group scale factor detection means as a block scale factor; and control means for performing control for data processing; and said control means reads data from said storage means in said data block unit, and for each data group of the data block, allots the data of the data group to the first scaling means of each of the calculation units, assigns the group scale factor detected by the group scale factor detection means to the second scaling means of each of the calculation units, and stores the calculated data from the second scaling means of each of the calculation units in the storage means, and when the operation is performed again on the calculated data in the storage means, said control means, for each data group of the data block, allots the calculated data of the data group to the first scaling means of each of the calculation units, and assigns a scale factor obtained as a difference between the group scale factor of the data group and the block scale factor to the first scaling means of each of the calculation units.

4. The data calculating device according to claim 3, wherein:

said device further includes second storage means for storing the group scale factor and the block scale factor;

said control means associates the group scale factor and the block scale factor with calculated data and stores the factors and the data in the second storage means; and when the operation is performed again on the calculated data in the storage means, said control means reads the corresponding group scale factor and block scale factor from the second storage means, and for each data group of the data block, allots the calculated data of the data group to the first scaling means of each calculation unit, and assigns the scale factor obtained as the difference between the group scale factor of the data group and the block scale factor to the first scaling means of each calculation unit.

5. The data calculating device according to claim 3 or 4, wherein said scale factor computation means computes a number of redundant bits of calculated data from the operation means, and outputs the number as a scale factor.

6. The data calculating device according to claim 5, wherein:

said operation means is a fixed-point operation unit;

said first scaling means shifts bits for the data by an amount of the shift corresponding to a given scale factor; and said second scaling means shifts bits for the calculated data from the operation means by an amount of the shift corresponding to another given scale factor.

7. The data calculating device according to claim 3, wherein said operation means is a multiply-accumulate operation unit for computing a sum of products of data from the first scaling means and a predetermined coefficient.

* * * * *